UNITED STATES PATENT OFFICE.

DANIEL O'KEEFE, OF BOSTON, MASSACHUSETTS, ASSIGNOR TO WILLIAM OLIVER WEBBER, OF SAME PLACE.

PROCESS OF TREATING ORE.

SPECIFICATION forming part of Letters Patent No. 635,056, dated October 17, 1899.

Application filed February 12, 1898. Serial No. 670,056. (No specimens.)

*To all whom it may concern:*

Be it known that I, DANIEL O'KEEFE, a citizen of Boston, in the county of Suffolk and State of Massachusetts, have invented certain new and useful Improvements in the Treatment of Ores for the Purpose of Extracting their Units of Value; and I hereby declare that the following is a full, clear, and exact description of the invention, which will enable others skilled in the art to which it appertains to use the same.

This invention relates to an improvement in the treatment of ores whereby the percentage of valuable units recovered is greatly increased, the time required for such treatment materially reduced, and a marked economy effected in labor and materials. Heretofore in the treatment of ores quite a large percentage of valuable units have been lost because of the inefficient manner of treating such ores and to the lack of time in which to accomplish such treatment; also, to the excessive cost of labor, materials, and time in proportion to the remaining units of value which may be recovered.

The objects of my invention are to thoroughly treat ores so as to completely recover all of the units of value contained therein, to have the different operations completed in a minimum amount of time, to make the operations continuous, and to have the different stages of the treatment follow each other in a consecutive manner, with provisions for interrupting and resubjecting the ores being treated to any of the previous operations or to pass by and omit any of the subsequent operations at the will and pleasure of the operator, as may seem desirable.

To carry my invention into effect I first introduce the ore to be treated into a system of mechanical disintegrators. While subjected to mechanical disintegration I also subject the same to a roasting heat for the purpose of causing the volatile impurities—such as sulfur, antimony, phosphorus, &c—to pass off in the form of gases and to render the ores more friable, so as to more readily admit of their disintegration by the mechanical disintegrators referred to. After roasting the ores while being mechanically disintegrated I subject the said ore to hydrogen gas under pressure for the purpose of converting to metal the oxids which have been formed and have adhered to particles of ore during the previous roasting.

To illustrate, in an iron sulfid ore containing gold the hydrogen would reduce to metal the ferric oxid which had been formed and had adhered to particles of gold ore during previous roasting. After this treatment, which has the effect of making the ore thus treated susceptible to the action of chlorin, I convert the gold into a soluble compound by forcing through it chlorin gas and steam under pressure. With a gold ore the gold is usually converted into chlorid within thirty minutes, although the actual time is dependent upon the characteristics of the ore. In this way I make a material saving over the usual time allowed for chlorination. The mass is then removed from the chlorination-tank, leached, and the gold precipitated from the solution in accordance with any of the well-known methods. The residue is then washed with warm salt-water to wash off any chlorin which may have adhered to the ore and which may prevent the formation of amalgams and then passed through an amalgamator to recover any gold which may have escaped chlorination. I do not confine myself to the use of chlorin in dissolving gold, as other agents may be employed, and in some instances it is possible to recover the units of value by directly amalgamating after the ore is passed through the hydrogen treatment.

When desirable, I treat the ore a second time by the application of hydrogen and the evaporation of moisture, vapor, and other gases prior to the treatment of the ore with quicksilver, so as to obtain the best results. In this process I supply these gases and liquids under pressure such as may be desired and insure their circulation by blowers, pumps, and other suitable means.

Having now fully described my invention, what I desire to protect and secure by Letters Patent is as follows:

1. The process of treating ore, consisting in roasting the same while being agitated, for the purpose of mechanical disintegration, subjecting the same to hydrogen gas under pressure, leaching the same with a liquid, and then evaporating any moisture or vapor present preliminarily to retreatment, substantially as described.

2. The process of treating ore, consisting of roasting the same while being agitated, for the purpose of mechanical disintegration, subjecting the ore to hydrogen gas under pressure, and afterward to chlorin gas, substantially as described.

3. The process of treating ore, consisting of roasting the same while being agitated, for the purpose of mechanical disintegration, subjecting the ore to hydrogen gas under pressure, afterward to chlorin gas, and then leaching the same with hot salt-water, substantially as described.

In testimony whereof I have signed my name to this application, in the presence of two subscribing witnesses, on this 11th day of February, A. D. 1898.

DANIEL O'KEEFE.

Witnesses:
   JOHN L. NICHOLS,
   FREDERICK W. GAY.